United States Patent
Rybak et al.

(10) Patent No.: US 9,516,700 B1
(45) Date of Patent: Dec. 6, 2016

(54) CLOUD-BASED CONTROLLER FOR MANAGING ACCESS POINTS

(71) Applicant: Google Inc., Mountain View, CA (US)

(72) Inventors: Alexander Rybak, San Francisco, CA (US); Alain Ayoub, San Jose, CA (US); Guilherme Henrique Trielli Ferreira, Mountain View, CA (US); Ezra Ludlow Gorman, Portland, OR (US)

(73) Assignee: Google Inc., Mountain View, CA (US)

( * ) Notice: Subject to any disclaimer, the term of this patent is extended or adjusted under 35 U.S.C. 154(b) by 55 days.

(21) Appl. No.: 14/496,045

(22) Filed: Sep. 25, 2014

(51) Int. Cl.
*H04W 92/12* (2009.01)
*H04W 80/08* (2009.01)
*H04W 88/08* (2009.01)

(52) U.S. Cl.
CPC .............. *H04W 92/12* (2013.01); *H04W 80/08* (2013.01); *H04W 88/085* (2013.01)

(58) Field of Classification Search
None
See application file for complete search history.

(56) References Cited

U.S. PATENT DOCUMENTS

| | | |
|---|---|---|
| 6,243,451 B1 | 6/2001 | Shah et al. |
| 6,903,755 B1 | 6/2005 | Pugaczewski et al. |
| 7,580,989 B2 | 8/2009 | Reeves, Jr. et al. |
| 7,966,388 B1 | 6/2011 | Pugaczewski et al. |
| 8,144,600 B2 | 3/2012 | Thomson et al. |
| 8,296,178 B2 | 10/2012 | Hudis et al. |
| 8,417,938 B1 | 4/2013 | Considine et al. |
| 2002/0023174 A1 | 2/2002 | Garrett et al. |

(Continued)

FOREIGN PATENT DOCUMENTS

| | | |
|---|---|---|
| EP | 1398985 A2 | 3/2004 |
| EP | 1806004 A2 | 7/2007 |
| WO | 2014098450 A1 | 6/2014 |

OTHER PUBLICATIONS

Priscaro, M. (Apr. 15, 2014). Ruckus Unveils Smart Access Management Public Cloud Service. Ruckus Wireless, Inc. Retrieved from <http://www.ruckuswireless.com/press/releases/20140415-ruckus-unveils-smart-access-management-public-cloud-service>, 5 pages.

*Primary Examiner* — Steven H Nguyen
(74) *Attorney, Agent, or Firm* — Lerner, David, Littenberg, Krumholz & Mentlik, LLP

(57) ABSTRACT

A system for managing a plurality of access points is provided that includes an interface device to receive configuration settings, a memory storing current settings and a processor coupled to the memory and the interface. The access points include first and second sets. Each set is provisioned to communicate on a respective communication protocol from a plurality of communication protocols. Each respective communication protocol is incompatible with the communication protocols for other access points. The one or more processors are configured to implement a management controller that includes a communication layer module to communicate using the respective communication protocol with the first set or the second set of access point devices and an abstraction layer module to apply configuration commands using the communication layer module to remotely reconfigure one of the plurality access point devices from the first or second set based on the configuration settings received from the interface.

20 Claims, 6 Drawing Sheets

(56) References Cited

U.S. PATENT DOCUMENTS

| | | | |
|---|---|---|---|
| 2003/0212768 A1* | 11/2003 | Sullivan | H04L 69/329 709/220 |
| 2007/0115950 A1* | 5/2007 | Karaoguz | H04L 41/082 370/356 |
| 2007/0268506 A1* | 11/2007 | Zeldin | H04L 41/0806 358/1.13 |
| 2007/0268514 A1* | 11/2007 | Zeldin | H04L 41/0213 358/1.15 |
| 2007/0268515 A1* | 11/2007 | Freund | H04L 67/34 358/1.15 |
| 2010/0002603 A1* | 1/2010 | Gupta | H04W 24/02 370/254 |
| 2010/0180016 A1* | 7/2010 | Bugwadia | G06F 9/4411 709/220 |
| 2010/0205281 A1* | 8/2010 | Porter | H04L 41/12 709/220 |
| 2012/0158813 A1 | 6/2012 | Kumar et al. | |
| 2012/0185913 A1 | 7/2012 | Martinez et al. | |
| 2012/0324081 A1 | 12/2012 | Yen et al. | |
| 2013/0031611 A1 | 1/2013 | Barreto | |
| 2013/0297800 A1 | 11/2013 | Considine et al. | |
| 2014/0036691 A1* | 2/2014 | Madan | H04W 24/10 370/242 |
| 2014/0051391 A1 | 2/2014 | Torres et al. | |
| 2014/0068705 A1 | 3/2014 | Chambers et al. | |
| 2014/0172947 A1 | 6/2014 | Ghai et al. | |

* cited by examiner

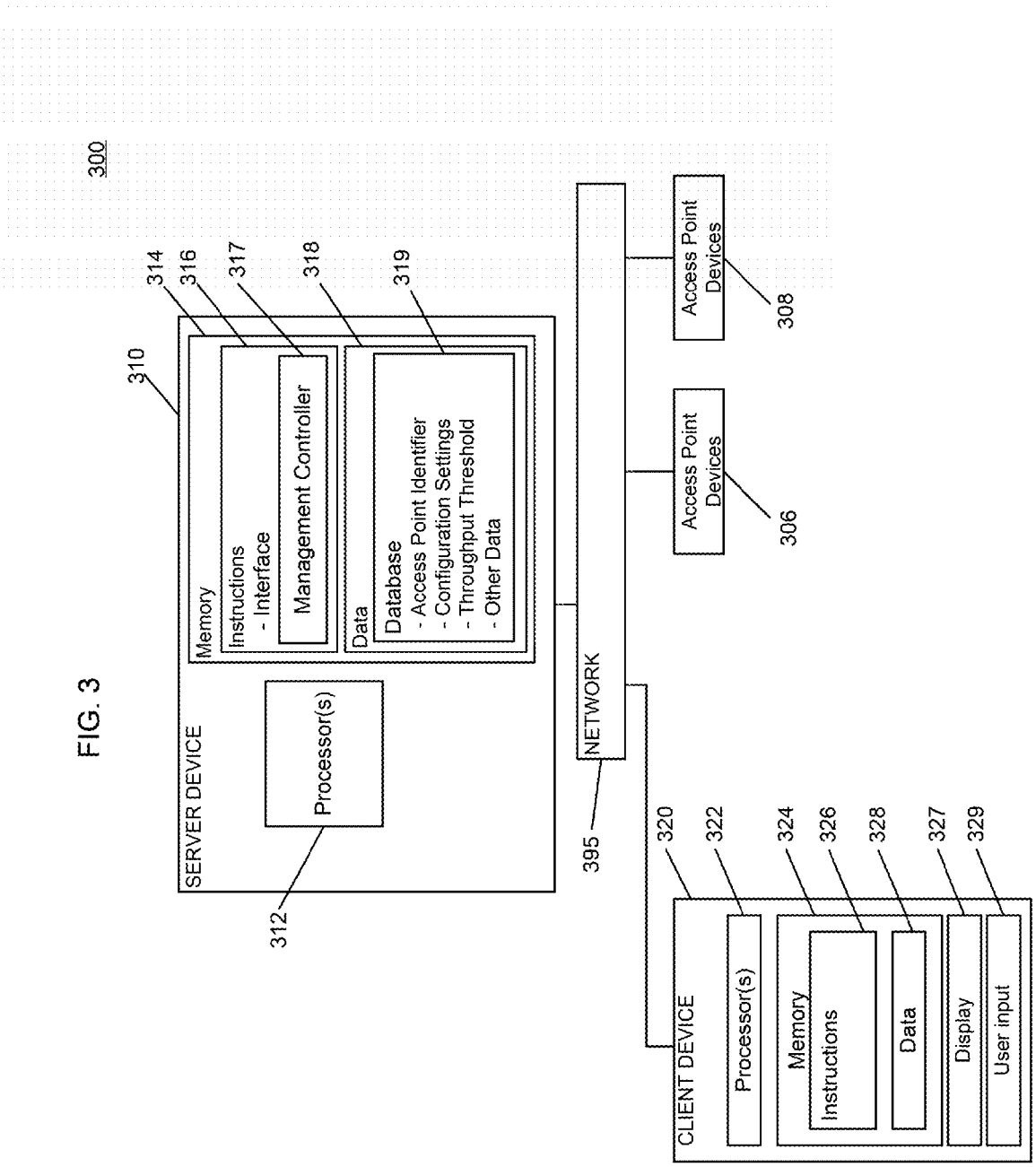

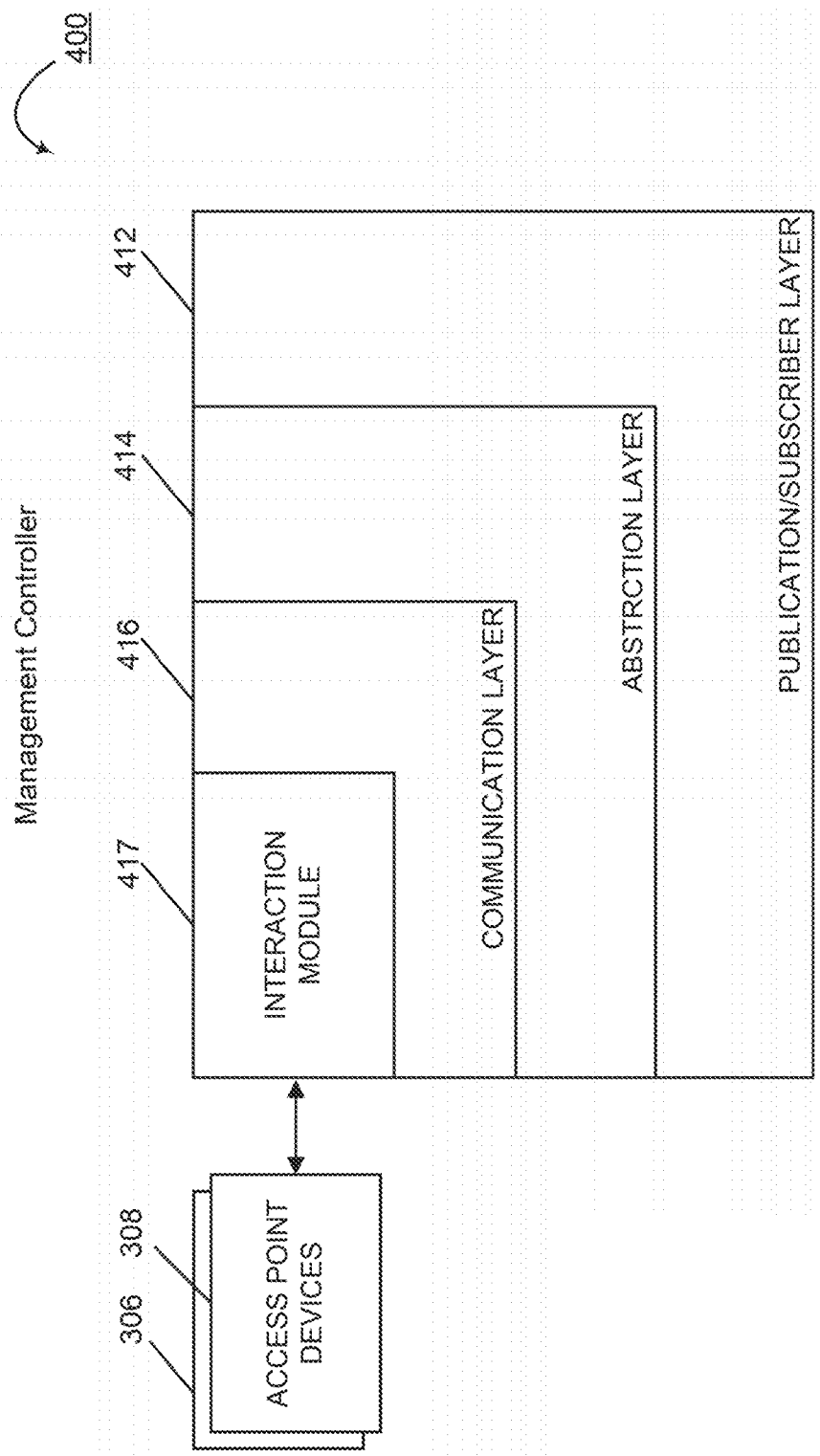

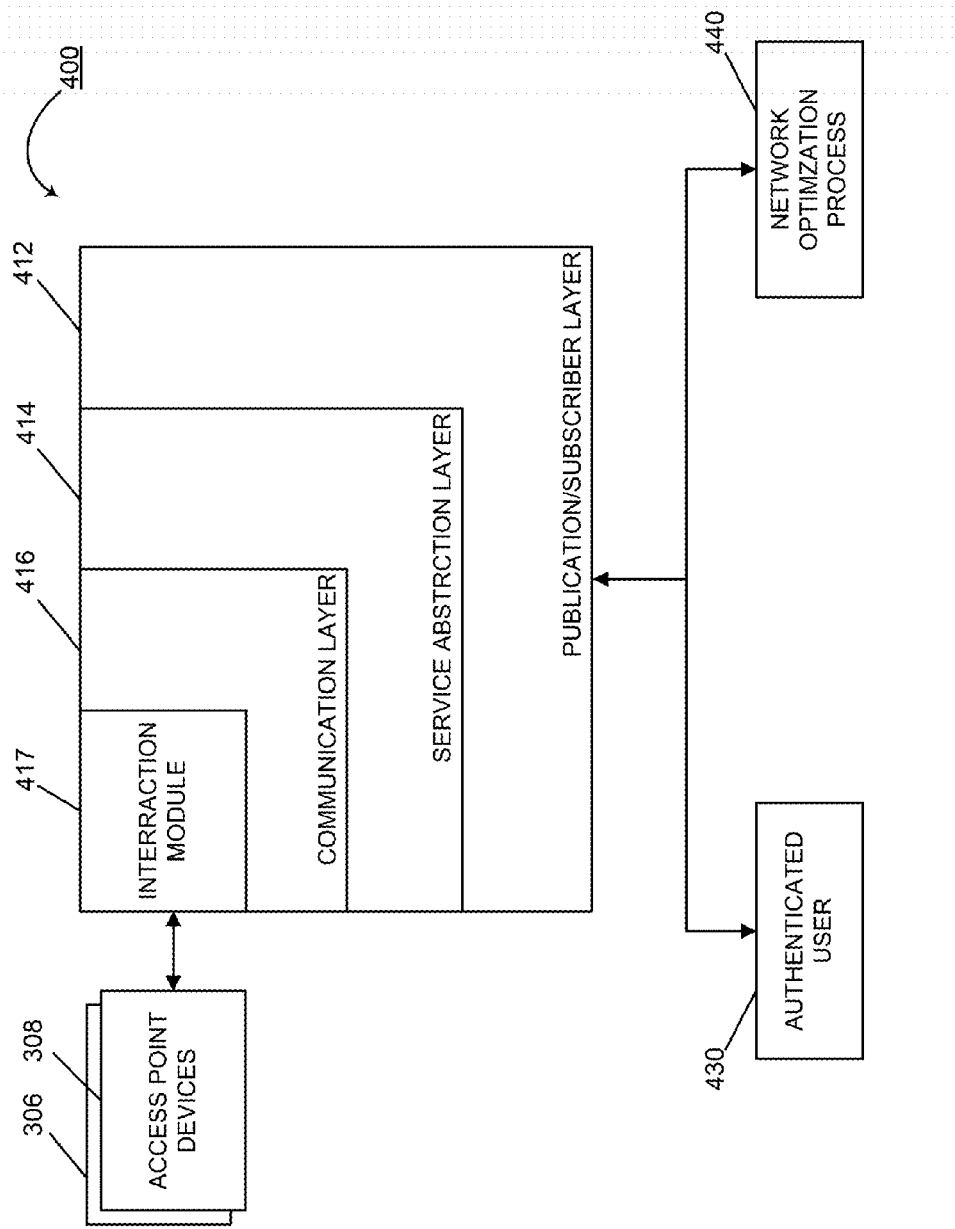

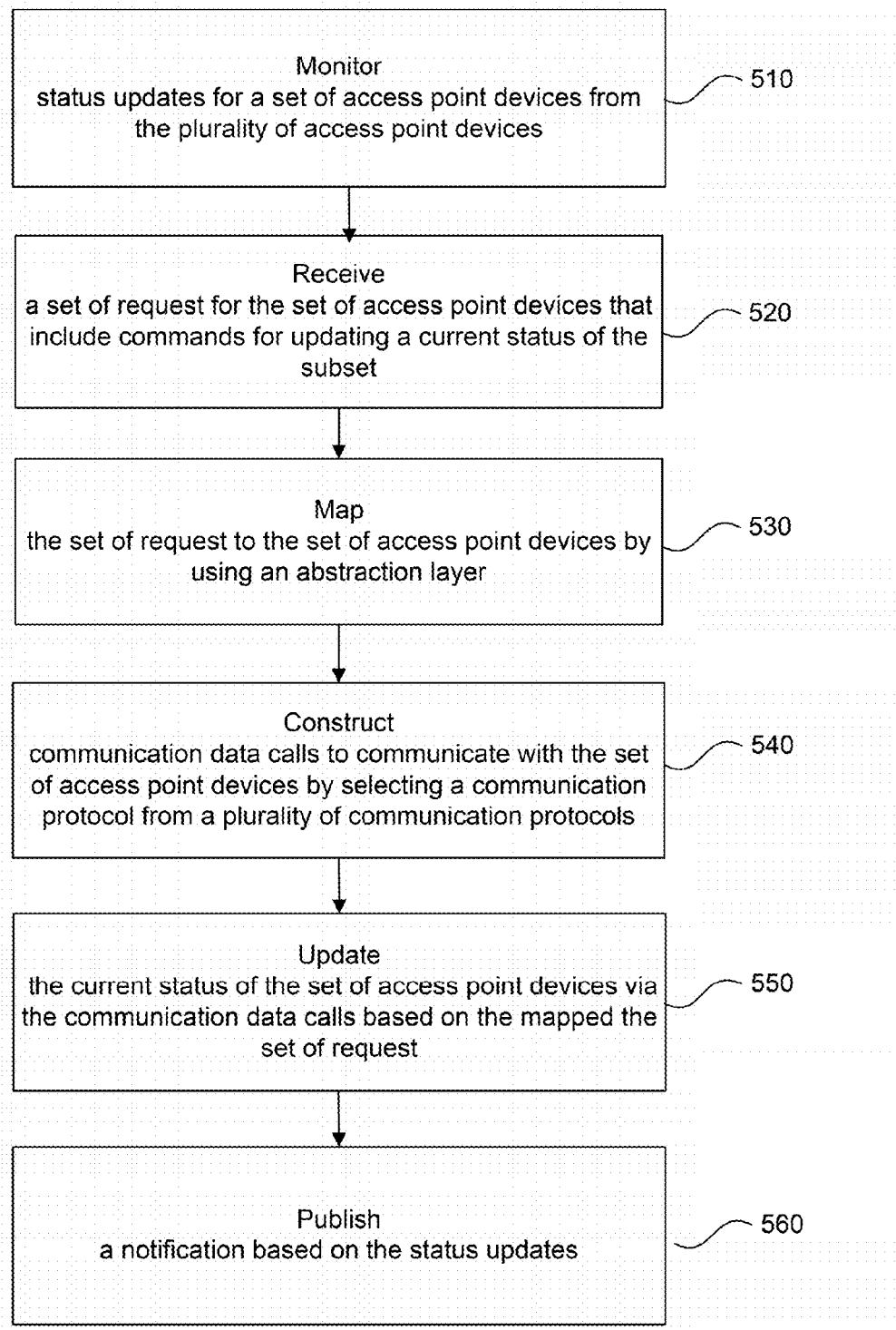

CLOUD-BASED CONTROLLER FOR MANAGING ACCESS POINTS

BACKGROUND

Various organizations utilize access points and associated wireless networks. These access points may include a multitude of different and unrelated systems and interfaces through which certain configuration changes can be made. Over time, as the needs of these organizations as well as available technology changes, the likelihood of these access points and interfaces being provided by different manufacturers and operating under different protocols may increase.

Typically, owners and managers of these access points may be able to use manufacturer provided controllers to make configuration changes to the access points for updating the network. However, many of these controllers may have been designed and pre-provisioned by a specific manufacturer to work solely with that manufacturer's specific access points. In addition, many of the access points can only be configured when they are directly coupled to the manufacturer specific controllers.

BRIEF SUMMARY

Aspects of the present disclosure are advantageous for providing a system for managing a plurality of access point devices. The system may include an interface device to receive configuration settings, a memory storing current settings and a processor coupled to the memory and the interface. The access point devices include first and second sets. Each set is provisioned to communicate on a respective communication protocol from a plurality of communication protocols. Each respective communication protocol is incompatible with the communication protocols for other access point devices. The one or more processors are configured to implement a management controller that includes a communication layer module to communicate using the respective communication protocol with the first set or the second set of access point devices and an abstraction layer module to apply configuration commands using the communication layer module to remotely reconfigure one of the plurality access point devices from the first or second set based on the configuration settings received from the interface device.

In one example, the communication layer module may be configured to construct data calls based on the respective communication protocol. The management controller may be configured to automatically configure access point devices from the first or second set to cooperatively work together. In this regard, the automatic configuration may be triggered when a load on an access point device of the first or second set meets a predetermined threshold level.

In another example, the interface device may be configured to authenticate a user for access to the first and second set. The abstraction layer module may be configured to map the configuration settings received from the interface device to the one or more configuration commands. In that regards, the one or more configuration commands may include at least one of an update command to update one or more settings of a given access point device, a boot command to reboot the given access point device, a reset command to reset the given access point device and a status command to receive a current status of the given access point device.

In yet another example, the management controller further comprises a subscriber layer module. This subscriber layer module may be configured to monitor configuration updates from the memory for one or more access point devices from the first or second set. In some embodiments, the subscriber layer module may be further configured to publish a notification based on the configuration updates. These published notifications associated with the configuration updates may be provided to the interface device.

In another embodiment, a method of managing a plurality of access point devices is provided. The method includes receiving, using one or more processors, configuration settings at an interface device for a plurality access point devices. The plurality access point devices may include first and second sets of access point devices. Each set of access point devices may be provisioned to communicate on a respective communication protocol from a plurality of communication protocols. Each respective communication protocol may be incompatible with the communication protocols for other access point devices of the plurality access point devices. Using the one or more processors, one or more configuration commands may be mapped to at least one of the access point devices from the first or second set based on the configuration settings received from the interface device. In this regard, a communication session may be established using the respective communication protocol to communicate with one more access point devices from the first set or the second set. Thereupon, at least one of the plurality access point devices from the first or second set may be remotely updated via the communication layer based on the mapped one or more configuration commands.

BRIEF DESCRIPTION OF THE DRAWINGS

FIG. 3 is a block diagram of a system in accordance with aspects of the present disclosure.

FIGS. 4A-4B are example depictions of a management controller in accordance with aspects of the present disclosure.

FIG. 5 is an example of a flow diagram in accordance with aspects of the disclosure.

DETAILED DESCRIPTION

Figure 1:
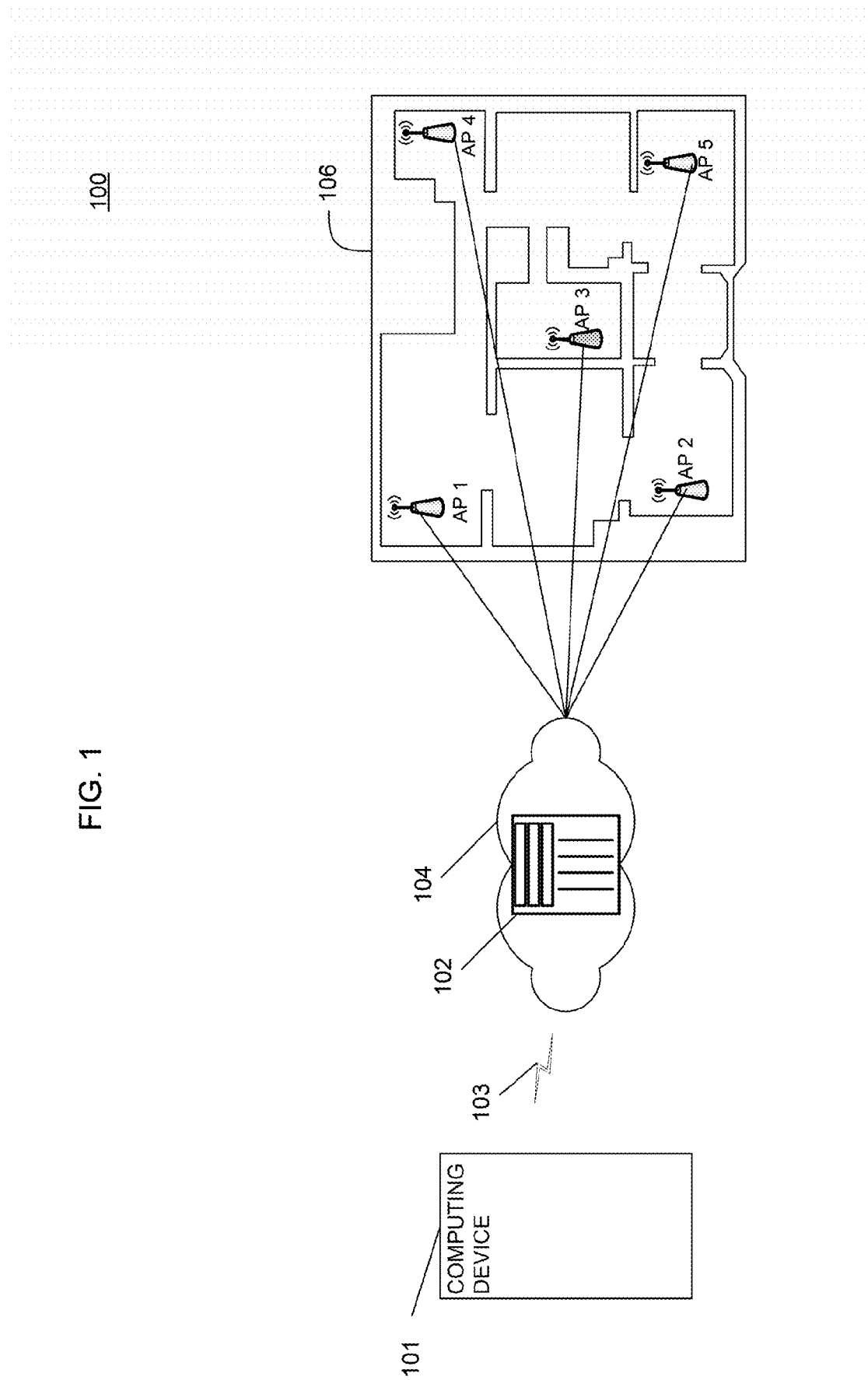
FIG. 1 is an illustration of a system in accordance with aspects of the present disclosure.

The present disclosure generally relates to providing cloud-based management systems for managing various different types of access point devices for a network. In some aspects, a system may include a memory storing a current status of access point devices or a particular set of access point devices, one or more processors, and a management controller coupled to the memory. The management controller may be in communication with the set of access point devices. In some examples, the memory may include a database that may include information regarding current configuration settings for the access point devices. For example, as the current status of a given access point device changes, an update event may be sent using a service in order to record this change with the current configuration settings in the database for that device.

The management controller of the system may include several components that can be executed by the processors, such as a communication layer to enable data communications over a plurality of communication protocols, such as a type of IEEE 802.1x protocol, and an abstraction layer for communicating with a set of access point devices. Each communication protocol of the communication layer may be associated with a given set of access point devices. For example, the communication layer may be used to construct appropriate calls based on a respective communication protocol from the plurality of communication protocol to communicate with the given set of access point devices.

An abstraction layer may be used for providing a set of requests to the given set of access point devices. This abstraction layer may provide a layer of abstraction for mapping these requests to a certain number of logic commands for managing and/or updating the current configuration or settings of the access point devices from the given set. The abstraction layer may transmit the mapped set of request to the access point devices by using the communication protocols from the communication layer.

To allow users to configure the current status of the access point devices of the given set, the management controller may include an interface that is in communication with the abstraction layer. This interface may be adapted to authenticate the users for allowing access to the access point devices. In some aspects, the interface may also allow users to update and configure the access point devices on behalf of the authenticated users. For example, requests may be entered into the interface to perform some type of action on one or more of the access point devices of the given set. In some embodiments, the requests may include at least one of an update command to update one or more settings of a given access point device, a boot command to reboot the given access point device, a reset command to reset the given access point device as well as a status command to receive a current status of the given access point device.

In some aspects, a process, such as a batch job, may be used to automatically configure the access point devices to cooperatively work together in an optimal way. In that regard, the process may cause the management controller to configure the set of access point devices to achieve such cooperation by sending an automated channel section request for each access point device of the set.

In other embodiments, the management controller may further include a subscriber layer. The subscriber layer may be programmed to monitor status updates from the memory for a given access point device and send a notification based on these status updates. In some example, the notification can be sent to a service where subscribers that are listening for changes on the given access point device can receive the notification.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

FIG. 1 is an illustration of a system 100 in accordance with aspects of the present disclosure. This example should not be considered as limiting the scope of the disclosure or usefulness of the features described herein. For example, the techniques described herein can be employed using various types of devices or other techniques for managing devices with different types of configurable settings. In this example, the system 100 may include a management server 102 coupled to a communications network 104 (e.g., the Internet) for controlling setting of a plurality of access point devices AP1-AP5 located at a location 106, and a computing device 101 in communication with the management server 102 via a connection 103.

The management server 102 may be used to remotely manage and store configuration information associated with the plurality of access point devices AP1-AP5. In this regard, management server 102 may communicate with the access point devices AP1-AP5 to perform certain configuration functions, such as firmware updating, configuration management, automated network optimization (e.g., channel selection) and etc.

Although only a few access point devices are shown in FIG. 1, the system 100 may include a large number of access point devices. These access point devices, such as access point devices AP1-AP5, may include various types of wired and/or wireless devices, such as routers, switches and other types of similar devices that allow for a computing device to connect to a network. In some embodiments, the plurality of access point devices may include different and/or similar makes and models. For example, access point device AP1 may be manufactured by one company and access point device AP2 may be manufactured by another company.

Similarly, different access point devices from the plurality of access point devices AP1-AP5 (even devices from the same manufacturer) may have different and/or similar configuration characteristics. For example, access point devices manufactured by one company may be provisioned to operate on a different wireless frequency or may use different and/or incompatible communication protocols than access point devices manufactured by another company.

The management server 102 may expose functionality for managing and configuring setting associated with an assortment of different kinds of devices that make up the plurality of access point devices AP1-AP5. This may allow management server 102 to manage the plurality of access point devices AP1-AP5 so that these access point devices can work cooperatively together. In some embodiments, the management server 102 may be configured to allow users to query and/or modify the configuration settings of the access point devices AP1-AP5 as well as send commands to the devices. As noted above, an advantage of the management server 102 is that it provides a layer of abstraction to hide manufacturer-specific details about the access point devices AP1-AP5 away from the users, such as a network administrator. Thus, significantly improving the ability of systems to efficiently manage a group of unrelated access point devices.

For users to communicate with the management server 102, computing device 101 may be used. For example, users may utilize a type of front end application associated with the computing device 101 for sending commands to and receiving data from the management server 102. In some embodiments, the users may have to install the application and/or select a service in order to obtain the benefits of the techniques described herein.

In some aspects, the application may be downloaded onto computing device 101. For example, the users may select to download the application from a service associated with an online server. The computing device 101 may transmit a request for the application over a network and in response, receive the application from the service. The application may be installed locally at the computing device 101. Alternatively, the application can be stored at the service and may be simply accessed through the computing device 101, for example, via a web browser.

While some aspects of the techniques described herein may be performed with an application installed on computing device 101, aspects may also be performed at remotely dispersed locations as well as on the computing device 101 (or some combination thereof). For instance, system 100 may include one or more geographically dispersed computing devices, such as management server 102, which may be used to manage the plurality of access point devices A1-A5. Examples of these types of systems are in further detail below with respect to FIGS. 2 and 3.

Figure 2:
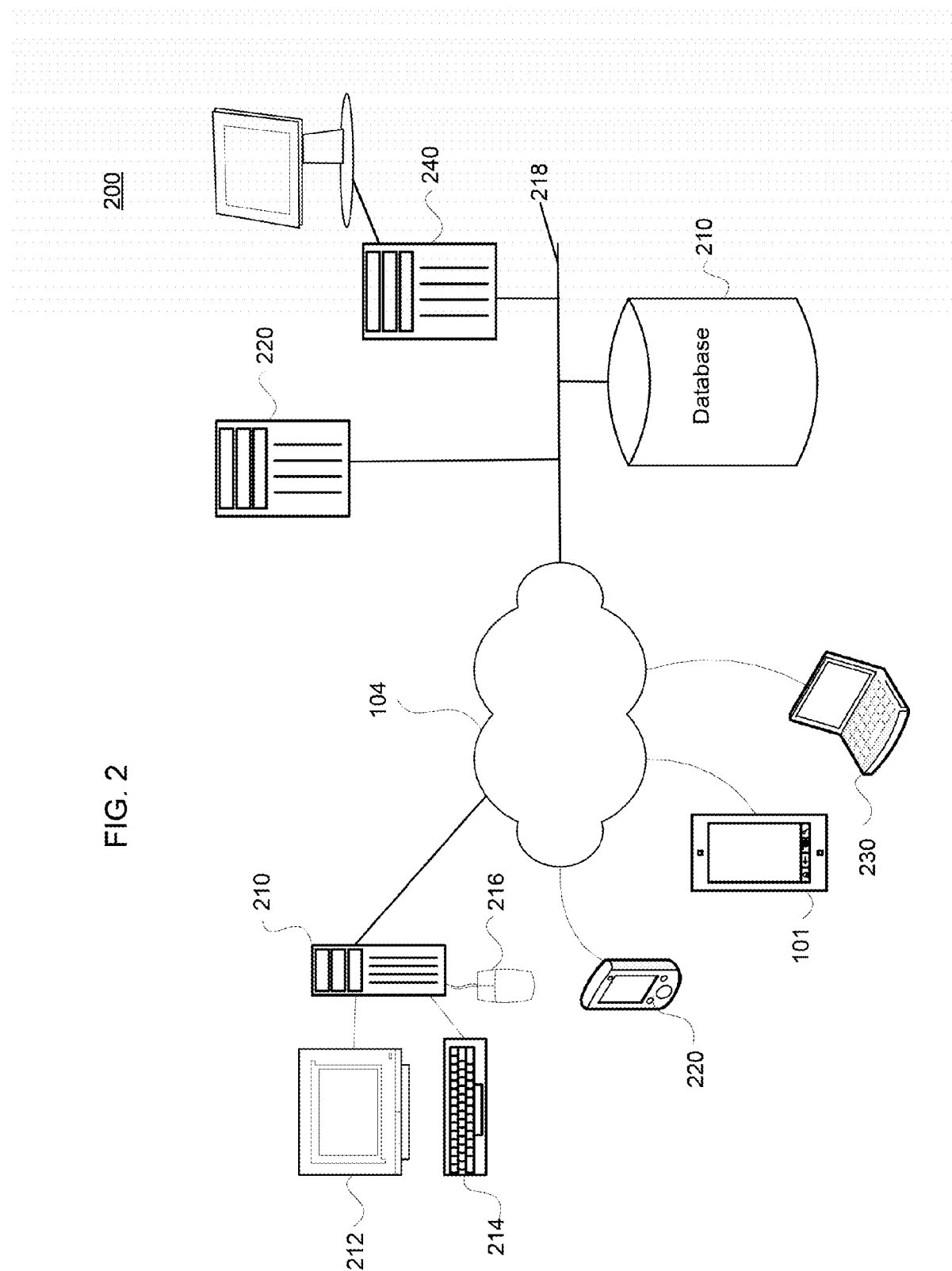
FIG. 2 is a pictorial diagram of a system in accordance with aspects of the present disclosure.

FIG. 2 is a pictorial diagram of a system 200, which may be used to implement aspects of the present invention as described herein. As shown, system 200 depicts various computing devices that can be used alone or in a networked configuration. For example, this figure illustrates a computer network having a plurality of computing devices 220 and 240, e.g., computing devices located at a number of different locations, as well as computing device 101 and other types of computing devices, such as computer terminal 210, PDA 220 and laptop/netbook 230. These various devices may be interconnected via a local bus or direct connection 218 and/or may be coupled via communications network 104 such as a LAN, WAN, the Internet, etc. and which may be wired or wireless.

Each computing device 101, 210, 220, 230 may include, for example, processors, memory, user input devices such as a keyboard 214 and mouse 216 and/or various other types of input devices such as pen-inputs, joysticks, buttons, touch screens, etc., as well as a display 212, which could include, for instance, a CRT, LCD, plasma screen monitor, TV, projector, etc. Each device may be a personal computer, application server, etc. By way of example only, computing device 240 may be a personal computer while computing device 220 may be a server, such as management server 102. Databases, such as database 210, may be accessible to one or more of the computing devices or other devices of system 200.

In FIG. 3, a block diagram of a system 300, such as a system for managing access point devices, such as access point devices 306 and 308, which may be the same or different than access point devices A1-A5, is depicted. As shown, the system 300 includes one or more computing devices like any of the computing devices 101, 210, 220, 230 of FIG. 2. For example, computing devices include a server device 310, such as management server 102, coupled to network 395 and a client device 320, which can be any one of the client devices 101, 210, 220, 230, and capable of communicating with the servers over the network 395. Server device 310 may include one or more processors 312, memory 314, and other components typically present in general purpose computers. Each processor of the one or more processors 312 may be a conventional processor, such as a processor found in commercially available computers. Alternatively, each processor may be a dedicated controller, such as an ASIC, FPGA or other hardware-based processors.

Memory 314 may store information that is accessible by the processors 312, including instructions 316 that may be executed by the processors 312, and data 318. The memory 314 may be of a type of memory including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 316 and data 318 are stored on different types of media.

Although FIG. 3 functionally illustrates the processors 312 and memory 314 as being within the same block, the processors 312 and memory 314 may actually include multiple processors and memories that may or may not be stored within the same physical housing. For example, some of the instructions 316 and data 318 may be stored on removable CD-ROM and others within a read-only computer chip. Some or all of the instructions 316 and data 318 may be stored in a location physically remote from, yet still accessible by, the processors 312. Similarly, the processors 312 may actually comprise a collection of processors, which may or may not operate in parallel.

Instructions 316 and 326 of the server device 310 and client device 320 respectively may be a set of instructions to be executed directly (such as machine code) or indirectly (such as scripts) by the processor. In that regard, the terms "instructions," "steps" and "programs" may be used interchangeably herein. The instructions 316 and 326 may be stored in object code format for direct processing by the processor, or in another computer language including scripts or collections of independent source code modules that are interpreted on demand or compiled in advance.

Data 318 may be retrieved, stored or modified by processors 312 in accordance with the instructions 316. For instance, although the present disclosure is not limited by a particular data structure, the data 318 may be stored in computer registers, in a relational database as a table having a plurality of different fields and records, XML documents, or flat files. The data 318 may also be formatted in a computer-readable format such as, but not limited to, binary values, ASCII or Unicode. By further way of example only, the data 318 may comprise information sufficient to identify the relevant information, such as numbers, descriptive text, proprietary codes, pointers, references to data stored in memory or information that is used by a function to calculate the relevant data. For example, the data 318 may include database 319 comprising information regarding the access point devices 306 and 308, which may include information relevant to identify an individual device from the database 319.

Database 319 of server device 310 (which may be compared to database 210) may store information regarding the access point devices that includes information representing current configuration settings for the devices. For example, each point device of system 300 may be associated with a set of information that includes a plurality of configuration settings stored in the database 319. The database 319 can include information relevant to identifying an individual or set of access point devices as well as other types of relevant data. For example, the database 319 may include an access point identifier, such as Media Access Control ("MAC") address or other identifiers for identifying each access point device and a throughput threshold indicating an amount of load that a given access point device can handle.

To populate the database 319, configuration information regarding the access point devices of system 300 may be gathered, for example, through a registration process. In one illustrative example, during the registration process, an administrator or owner may use a client device, such as client device 320, to provision each access point device or set of access point devices to operate with system 300. When each type of access point device is registered, registration information may be provided regarding that device. This registration information may include, for example, a device description and manufacturer, IP address, mac address and other types of relevant information. After the access point devices are registered with system 300, current configuration information for the access points devices may be directly obtained from the devices via the network 395. For example, as shown in FIG. 3, access point devices 306 and 308 may be accessible via the network 395. This configuration information from the access point devices may be used to update information contained in the database 319.

In some embodiments, the database 319 may be made up of components that are physically distinct from server device 310. Alternatively, the database 319 may be internally included with the server device 310. For example, the database 319 may be in the memory 314 of server device 310. In other embodiments, the database 319 can be divided into multiple databases with components that can be geographically dispersed at different locations, such as at a server farm.

Server device 310 may be at one node of network 395 and capable of directly and indirectly communicating with other nodes of the network 140. For example, the server device 310 may include a web server that may be capable of communicating with client device 320 via network 395 such that it uses the network 395 to transmit and display information to a user on a display 327 of the client device 320. The server device 310 may also include a plurality of computers that exchange information with different nodes of the network 395 for the purpose of receiving, processing and transmitting data to the client devices. In this instance, the client devices, such as client device 320 will typically still be at different nodes of the network 395 than the computers comprising server 310.

Client device 320 may be configured similarly to the server 310, with a processor 322, memory 324, instructions 326, data 328 and all of the internal components normally found in a personal computer. By way of example only, the client device 320 may include a central processing unit (CPU), such as processor 322, display device 321 (for example, a monitor having a screen, a projector, a touch-screen, a small LCD screen, a television, or another device such as an electrical device that is operable to display information processed by the processor 322), CD-ROM, hard-drive, user input device 329 such as a keyboard, mouse, touch-screen or microphone, speakers, modem and/or network interface device (telephone, cable or otherwise) and all of the components used for connecting these elements to one another.

By way of example only, client device 320 may be a computing device, such as a laptop computer, a netbook, a desktop computer, and a portable personal computer such as a wireless-enabled PDA, a tablet PC or another type of computing device capable of obtaining information via a network like the Internet. Although the client device 320 may include a full-sized personal computer, the subject matter of the present disclosure may also be used in connection with mobile devices capable of wirelessly exchanging data. For example, client device 320 may be a wireless-enabled device, such as a tablet computer, or an Internet-capable mobile device. In either regard, information may be inputted by using a small keyboard, a keypad, a touch screen, light pen or other means of user input. In various aspects, the client devices and computers described herein may comprise a device capable of processing instructions and transmitting data to and from humans and other devices and computers.

Network 395 like network 104 may include various configurations and protocols including the Internet, World Wide Web, Bluetooth, intranets, virtual private networks, wide area networks, local networks, private networks using communication protocols proprietary to one or more companies, Ethernet, WiFi (e.g., 802.11, 802.11b, g, n, or other such standards), HTTP, and various combinations of the foregoing. Such communication may be facilitated by a device or devices capable of transmitting data to and from other computers, such as modems (e.g., dial-up, cable or fiber optic) and wireless interfaces.

Although certain advantages are obtained when information is transmitted or received as noted above, other aspects of the subject matter disclosed herein are not limited to a particular manner of transmission of information. For example, in some aspects, information may be sent via a medium such as a disk, tape or CD ROM. Yet further, although some functions are indicated as taking place on a single server having a single processor, various aspects may be implemented by a plurality of servers, for example, communicating information to client device 320 over network 395.

In order to facilitate operations of system 300 for managing the access point devices, the server 310 may further include a management controller module 315. For example, management controller module 315 may be configured to manage various kinds and different types of access point devices.

To communicate with the management controller module 315, the server device 310 may include an interface, such as a web browser interface or other types of interface devices, for entering request and/or receiving data regarding the access point devices. By way of example only, user requests for updating configuration settings of access point devices 306 and 308 can be made through the interface and transmitted electronically for processing. In this regard, the interface may provide information to the client device 320 regarding the access point devices 306 and 308 by sending and receiving information/data across the network 395. As noted above, part all of this interface may reside on the server device 310 as well as the client device 320 or some combination thereof.

In response to receiving request from the interface, certain database information may be accessed and/or stored in database 319. This may include accessing configuration information from the database 319 regarding the access point devices 306 and 308 and in turn updating configuration information in the database 319 regarding the devices.

In some embodiments, the functionality of management controller module 315 can exist in a fewer or greater number of modules than what is shown, with such modules residing at one or more computing devices that may be geographically dispersed. The modules may be operable in conjunction with client device 320 from which it may receive and provide relevant information (e.g., current configuration settings) regarding the access point devices.

FIGS. 4A-4B are example depictions of a management controller 400, such as the managing controller module 315 of server 310. As noted above, management controller 400 may provide a centralized management interface for remotely managing or reconfiguring different types of access point devices.

As shown in FIG. 4A, the management controller 400 may include a publication/subscriber layer 412 for receiving and publishing configuration change request for a plurality of access point devices, such as the access point devices 306 and 308, an abstraction layer 414 for mapping the configuration change request to the given set of access point devices by using communication layer 416 and the communication layer 416 may comprise an interaction module 417 that may be configured to interact or otherwise communicate with the plurality of access point devices 306 and 308. In this regard, the interaction module 417 may include or be in communication with circuitry that can be dynamically configured to enable data communications between the management controller 400 and the access point devices 306 and 308. For example, the circuitry may include certain circuitry disposed on server 310, such as WLAN PCI card, or other types of circuitry for communicating with access point devices using a particular communication protocol that may be specific to the manufacturer of the devices.

The publication/subscriber layer 412 may accept incoming status updates (e.g., configuration updates) and notifications regarding the access point devices 306 and 308. For example, when a change happens to an access point device, the device may send a signal (e.g., an HTTPS post) to the interaction module 417 to indicate that the change has happened. This signal may be then used to update the configuration settings information regarding that access point device. For example, based on this signal, the management controller may update the current configuration settings for the access point device in database 319 of server 300. Thereafter, a notification reflecting this update may be sent from the publication/subscriber layer 412 to any subscribers that are listing for configuration changes to that access point device.

The abstraction layer 414 may encapsulate core logic for the management operations of the access point devices 306 and 308. For example, the abstraction layer 414 may expose a set of services for sending and applying actionable commands or requests to the access point devices 306 and 308, and may poll the devices to determine if the commands have been executed. Some example of these actionable commands may include polling for the status of a pending command to determine if the command has completed, booting a particular access point device or set of access point devices, or performing a factory reset on the device. As noted above, the abstraction layer 414 may map the commands to the access point devices 306 and 308. In some embodiments, the mapped set of commands may be transmitted via the communication layer 416 of management controller 400 in order to update the current status configuration of the access point devices 306 and 308.

The communication layer 416 contains logic and data for establishing a communication session with a variety of different types of access point devices including access point devices of different manufacturers. This communication layer 416 may be directly controlled, for example, by the processors 312 of server 300 to determine an appropriate communication protocol for communicating with access point devices 306 and 308. In order to determine an appropriate communication protocol, the communication layer 416 may include or access information regarding a plurality of communication protocols such as, for example, a particular IEEE 802.1x protocol. Each communication protocol of the plurality of communication protocols may be associated with a set of access point devices. In some embodiments, each communication protocol for a given set may be incompatible with the communication protocol for another set of access point devices.

Information regarding the various communication protocols for the access point devices 306 and 308 may be gathered, for example, during the registration process for a particular set of access point devices or by other techniques, such as from a source associated with the manufacturer of the access point devices 306 and 308 or other sources. In some embodiments, the communication protocol information associated with a given access point device may be stored and retrieved from database 319. For example, the processors 312 of server 300 may retrieve the communication protocol information from database 319 by using an identifier for the access point device. Based on the retrieved communication protocol information, the interaction module 417 of communication layer 416 may establish a communication channel between access point devices and the management controller 400. Thereupon, the communication layer 416 may construct communication calls using the communication protocol information to transmit and receive data from the access point devices 306 and 308. As noted above, this data may include commands, for example, to update the configuration settings of the access point devices 306 and 308.

In operation, the management controller 400 may be configured to receive commands from a number of different clients. For example, turning to FIG. 4B, different clients, such as an authenticated user 430 (e.g., a network administrator) and a network optimization process 440, are shown in communication with the management controller 400. These different clients may provide request to the management controller 400 that include commands for updating the current status (e.g., configuration settings) of the access point devices 306 and 308. In some embodiments, security techniques may be employed to ensure that the different clients are authorized to update the access point devices 306 and 308. For example, the authenticated user 430 may be prompted to login to server device 310 before access to the management controller 400 may be permitted. These login credentials may be passed through to the access point devices 306 and 308 by the management controller 400 to ensure that the authenticated user 430 is authorized to send commands to those devices.

In one operational example, the management controller 400 may update and configure the access point devices, such as either access point devices 306 and 308 on behalf of the authenticated user 430. In this example, the authenticated user 430 may send request to the management controller 400 to perform some command on the access point devices, for example, by using the interface of client device 320. Next, the abstraction layer 414 may map the commands to the access point devices. This may prompt the communication layer 416 to select a specific communication protocol for communicating with the access point devices. As noted above, each access point devices 306 and 308 may have a specific communication protocol for that device, which may have been set by the manufacturer.

In turn, the interaction module 417 may create communication calls using the specific communication protocol for the access point devices to send the mapped commands. These mapped commands may be then processed, for example, by firmware of the access point devices 306 and 308. When the access point devices 306 and 308 are finished executing the mapped commands, the devices may send a status update to the interaction module 417 to indicate that the command has been completed. The publication/subscriber layer 412 may then publish these status updates.

In another operational example, the network optimization process 440 may be configured to cause the management controller 400 to reconfigure the access point devices 306 and 308. For example, the network optimization process 440 may run an analysis on a certain set of access point devices from the access point devices 306 and 308 and then may decide to reconfigure the set (e.g., set a new channel for the set) based on this analysis. In that regard, the network optimization process 440 may send commands to the management controller 400 with updated configuration changes for each access point device of the set to be changed.

In yet another operational example, management controller 400 may be configured to automatically react and send alert, for example, in case of local changes to the access point devices 306 and 308. For example, if a new device connects to one of the access point devices 306 and 308 and starts to download a large file. This may trigger a threshold alert associated with that access point device. For example, if a load on the access point device meets a certain throughput threshold level this may indicate that the device may be under a heavy load. As noted above, the throughput threshold indicator may be stored in database 319. In this example, once the load on the access point device meets throughput threshold level, a notification or alert may be sent to the interaction module 417, which may be published by the publication/subscriber layer 412 of the management controller 400. This notification can be forward, for example, to the display 327 of client device 320 to the authenticated user 430 (e.g., a system administrator) who may be monitoring the network load.

To better aid in understanding an example of some of the aspects described above, reference is now made to FIG. 5, which is a flow diagram 500. As previously discussed, the following operations do not have to be performed in the precise order described below. Rather, as mentioned above, various operations can be handled in a different order or simultaneously, and operations may be added or omitted.

In block 510, status updates from a first set of access point devices from a plurality of access point devices may be monitored. For example, a client, such as a network administrator, using a client device, such as client device 320, may subscribe to a management controller, such as management controller 400, to listen for updates to configuration setting for the first set of access point devices. This subscription may include subscribing to the publication/subscriber layer 412 of the management controller 400.

In block 520, a set of request for the first set of access point devices may be received, for example, at an interface associated with the management controller. The set of request may include commands for updating a current status of the first set. For example, a client with permissions to update the access point devices may send commands to update settings for access a network associated with the access point devices. In some examples, this client may include an authenticated user, a network process or other types of authorized clients.

In block 530, the set of request may be mapped to the first set of access point devices by using an abstraction layer, such as abstraction layer 414. For example, the abstraction layer may provide a layer of abstraction for mapping the requests to a certain number of specific logic commands for configuring current settings of first set of the access point devices.

In block 540, communication calls to communicate with the first set of access point devices may be constructed by selecting a communication protocol from a plurality of communication protocol at a communication layer, such as communication layer 416 of the management controller 400. The selected communication protocol may include a manufacturer specific communication protocol for the first set of access point devices. Based on the type or manufacturer of access point devices, the communication layer 416 may establish a communication session by selecting the correct communication protocol for communicating with that device.

In block 550, the current status of the first set for access point devices may be updated via the communication calls based on the mapped set of request. For example, the interface module 417 of the communication layer 416 may establish a communication session with the access point devices using the selected communication protocol from block 530. Once the communication session is established, the set of request may be transmitted to the first set for updating a current status of the access point devices in the set.

In block 560, a notification may be published based on the updated current status. For example, based on the updates from block 550, the publication/subscriber layer 412 of the management controller 400 may provide a type of alert to the clients that have subscribed in block 510 to monitor the access points for status updates.

The above-described aspects of the present disclosure may be advantageous for providing a cloud-based management system for managing access point network configurations. By exposing a set of high-level commands to hide or otherwise abstract manufacturer-specific configuration details regarding the access point devices, the system may allow an authenticated user to manage and share control of these access point devices regardless of the manufacturer of each particular device. Moreover, the techniques as described herein may also allow users to control and manage aspects of their access point devices from any location, rather than requiring the users to be directly connected to the device in order to manage them. Even further, the methods and systems of this disclosure provide a single mechanism for both providing access and sharing the access point devices with users as well as processing and analyzing data about all of the managed access points.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended.

The invention claimed is:

1. A system comprising:
    an interface device to receive from a remote client computing device configuration settings for a plurality of access point devices, wherein the plurality of access point devices includes first and second sets of access point devices, the first set of access point devices provisioned to communicate on a first communication protocol and the second set of access point devices provisioned to communicate on a second communication protocol that is incompatible with the first communication protocol; and
    one or more processors coupled to the interface device, the one or more processors being configured to implement a management controller, the management control controller comprising:
        a communication layer module to communicate with the first set of access points using the first communication protocol and to communicate with the second set of access points using the second communication protocol; and
        an abstraction layer module to apply one or more configuration commands using the communication layer module to remotely configure at least one of the plurality of access point devices from the first or second set based on the configuration settings received at the interface device.

2. The system of claim 1, wherein the communication layer module is configured to construct data calls based on the respective communication protocol.

3. The system of claim 1, wherein the interface device is configured to authenticate a user for access to the first and second set.

4. The system of claim 1, wherein the management controller is configured to automatically configure access point devices from the first or second set to cooperatively work together.

5. The system of claim 4, wherein the automatic configuration is triggered when a load on an access point device of the first or second set meets a predetermined threshold level.

6. The system of claim 1, wherein the abstraction layer module is configured to map the configuration settings received from the interface device to the one or more configuration commands.

7. The system of claim 6, wherein the one or more configuration commands includes at least one of an update command to update one or more settings of a given access point device, a boot command to reboot the given access point device, a reset command to reset the given access point device or a status command to receive a current status of the given access point device.

8. The system of claim 1, wherein the management controller further comprises a subscriber layer module, the subscriber layer module being configured to monitor configuration updates from the memory for one or more access point devices from the first or second set.

9. The system of claim 8, the subscriber layer module is further configured to publish a notification based on the configuration updates.

10. The system of claim 9, wherein the published notification associated with the configuration updates is provided to the interface device.

11. A method comprising:
receiving, using one or more processors at an interface device, configuration settings from a remote client computing device for a plurality of access point devices, wherein the plurality of access point devices includes first and second sets of access point devices, the first set of access point devices is provisioned to communicate on a first communication protocol and the second set of access point devices is provisioned to communicated on a second communication protocol that is incompatible with the first communication protocol;
mapping, using the one or more processors, first configuration commands to at least one of the first set of access point devices based on the configuration settings received from the interface device;
establishing, using the one or more processors, a communication session using the first communication protocol to communicate with the at least one of the access point devices from the first set;
remotely updating, using the one or more processors, at least one of the first set of access point devices via the communication layer based on the mapped first configuration commands;
mapping, using the one or more processors, second configuration commands to at least one of the second set of access point devices based on the configuration settings received from the interface device;
establishing, using the one or more processors, a communication session using the second communication protocol to communicate with the at least one of the access point devices from the second set;
remotely updating, using the one or more processors, at least one of the second set of access point devices via the communication layer based on the mapped first configuration commands.

12. The method of claim 11, further comprising constructing, using the communication layer module construct data calls to communicate with the first set or the second set based on the respective communication protocol.

13. The method of claim 11, further comprising authenticating a user for access to the first and second set.

14. The method of claim 11, further comprising automatically configuring access point devices from the first or second set to cooperatively work together.

15. The method of claim 14, wherein the automatic configuration is triggered when a load on an access point device of the first or second set meets a predetermined threshold level.

16. The method of claim 11, further comprising mapping the configuration settings received from the interface device to one of the first configuration commands or the second configuration commands using the abstraction layer module.

17. The method of claim 16, wherein the first and second configuration commands includes at least one of an update command to update one or more settings of a given access point device, a boot command to reboot the given access point device, a reset command to reset the given access point device or a status command to receive a current status of the given access point device.

18. The method of claim 11, further comprising monitoring configuration updates from for one or more access point devices from the first or second set.

19. The method of claim 18, further comprising publishing a notification based on the configuration updates.

20. The method of claim 19, wherein the notification associated with the configuration updates is provided to the interface device.

* * * * *